July 2, 1929.  A. L. MOLER  1,719,071
APPARATUS FOR AND SYSTEM OF LUBRICATION
CIRCULATION FOR JOURNAL BRASSES
Filed July 29, 1926  3 Sheets-Sheet 1
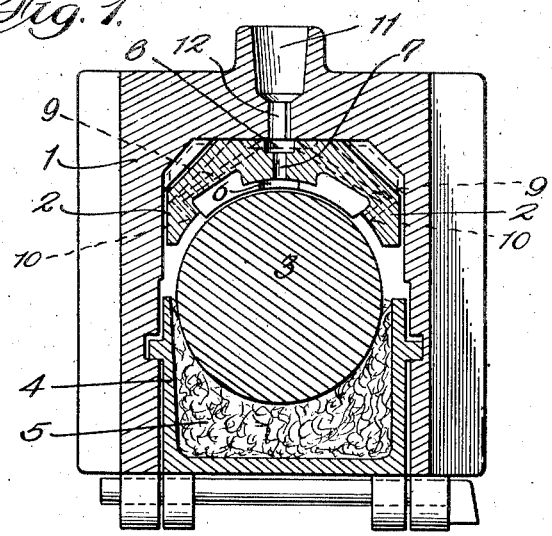
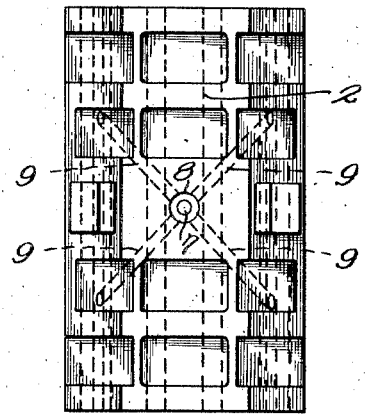
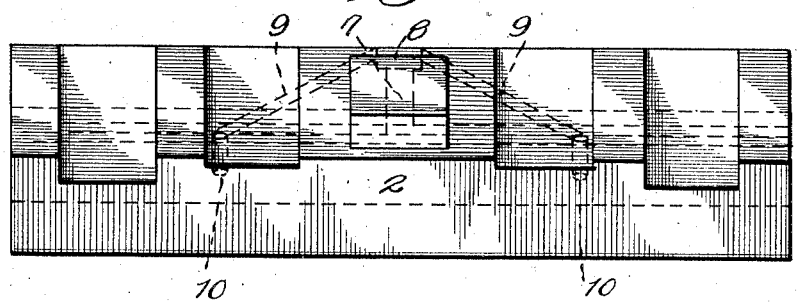
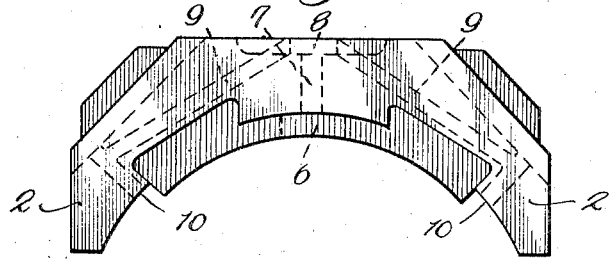
Inventor
Abraham L. Moler
By Edwin S. Clarkson
Attorney July 2, 1929.　　　A. L. MOLER　　　1,719,071
APPARATUS FOR AND SYSTEM OF LUBRICATION
CIRCULATION FOR JOURNAL BRASSES
Filed July 29, 1926　　　3 Sheets-Sheet 2

Inventor
Abraham L. Moler
By
Attorney

Patented July 2, 1929.

1,719,071

UNITED STATES PATENT OFFICE.

ABRAHAM L. MOLER, OF RICHMOND, VIRGINIA.

APPARATUS FOR AND SYSTEM OF LUBRICATION CIRCULATION FOR JOURNAL BRASSES.

Application filed July 29, 1926. Serial No. 125,732.

As early as 1885 (see Kent, proceedings Institute Mechanical Engineers, January, 1885, page 1610, "Oil pressure and bearings") it was well known that oil was carried from the packing in the cellar at the bottom of the journal box, up under the journal brass, thus filling the customary longitudinal groove in the top of the journal brass, and then forcing it out through the oil hole extending from such longitudinal groove to the top of the brass from which hole the oil wasted out over the top of the brass and became lost, the result of which is that the packing becomes very dry and glazed, which in turn, produced a hot bearing.

Many efforts have been made to return the oil to the oil cellar and the packing waste, but so far as I am aware this has not been successfully accomplished.

On the long passenger runs which have recently been inaugurated on most railroads it has been a most difficult and expensive problem to prevent hot bearings because the engine truck brass and the trailer brass will, after about 100 miles run, become very hot, and on this account the railroads have been compelled, and are still compelled (where my invention is not used) to have box packers stationed along their line at intermediate points of approximately 100 miles to repair these journal boxes and make it possible for one engine to cover from 300 to 500 and 600 mile divisions, all of which adds materially to the operating expenses of railroads.

In my experiments to overcome the then existing conditions and to ascertain the real cause of the exhaustion and waste of oil, I rode on the front of a locomotive engine to determine definitely what would happen and ascertain approximately the rate of speed at which oil would begin to flow out over the top of the brass as there were many theories advanced for the cause of the oil exhaustion and I found that at a speed of 35 to 40 miles per hour oil would flow in a constant stream, that is to say, it was being raised more than six inches high up through the top of the brass after which it flowed over the top of the journal box and wasted back over the engine truck, frame, springs, etc. This demonstrated conclusively that it was impossible to keep the oil in the cellar and the packing at the bottom because the oil did not flow back to the cellar and consequently the waste in the cellar becomes dry and glazed, all of which resulted in a hot bearing.

The primary object of my invention is to prevent the waste of oil by storing it in the sump, or other suitable receptacle as it flows from the journal at high speed and permitting the oil, by gravity, to flow back to the oil cellar and thereby keep the packing at all times rich and well saturated with oil; that is to say, the lubricating circulating system of journal brasses, according to my invention, consists in flowing the surplus lubricant fed to the brass at high speed to the sump, storing it in said sump, and then permitting the oil to flow from said sump by gravity into the oil cellar.

According to my invention the apparatus consists, broadly stated, of a journal brass having oil ducts extending upward through the same, an oil sump in constant communication with said ducts and constantly opened ducts leading from the sump to flow the oil to the oil cellar at bottom of journal.

In the drawing:

Figure 1 is a vertical sectional view through a journal box of standard make in which my invention has been embodied.

Figure 2 is a top plan view of the journal brass shown in Figure 1.

Figure 3 is an end elevation of the journal brass shown in Figure 1.

Figure 4 is a side elevation of the journal brass shown in Figure 1.

Figure 5:
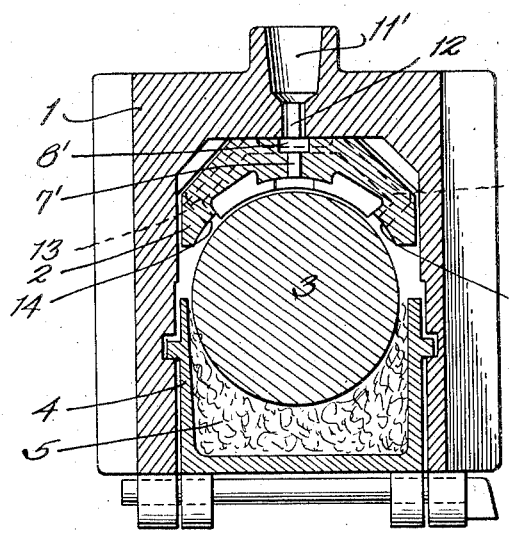
Figure 5 is a view of a journal box similar to Figure 1.
Figure 6:
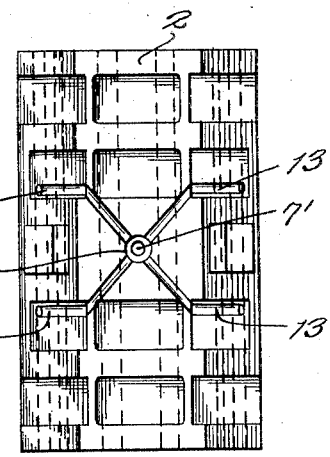
Figure 6 is a top plan view of the brass shown in Figure 5.
Figure 8:
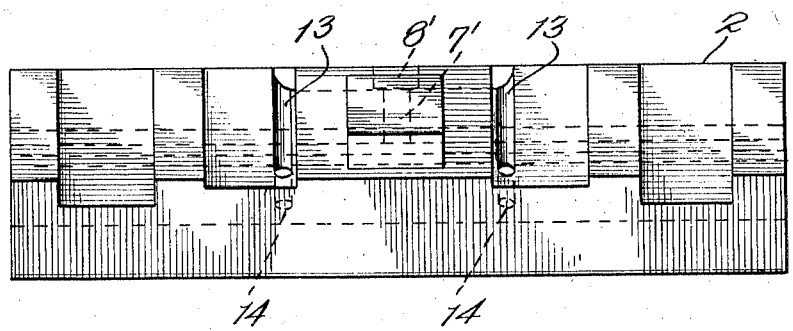
Figure 8 is an end side elevation of the brass shown in Figure 5.
Figure 7:
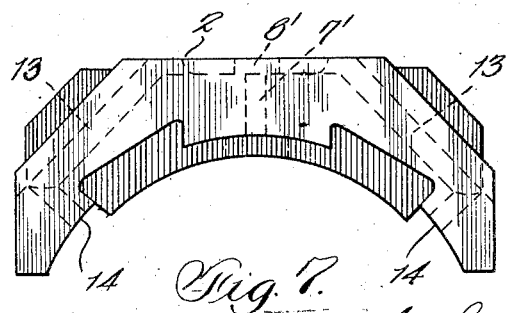
Figure 7 is an end elevation of the brass shown in Figure 5.

The reference numeral 1 designates a journal box provided with the journal brass 2 against which the journal 3 has its bearing, the oil cellar 4 is of standard construction and packed with waste 5. As is usual, the oil cellar is filled with oil and waste.

The journal brass is, as usual, provided with the longitudinal groove 6 from which the usual oil hole or duct 7 extends vertically to the top of the brass. The oil hole or duct 7, in my invention, is distinguished from the customary oil port by enlarging its diameter at its upper end portion as indicated by the reference numeral 8. Oil ducts 9 are formed in the brass, the upper end of each duct being in constant open communication with the enlarged portion 8 of the duct 7, while the lower ends 10 of these ducts are constantly open and discharge at a point beyond the bearing surface between the journal and the brass so that these return feed ducts 9 do not lead the oil back to the journal bearing face, but permit the oil to drop back into the cellar.

I provide at the top of the journal box an oil sump 11 which is in constant open communication with the upper sump 8 of the duct 7 by means of the duct 12 whereby the overflow tank 11 is in constant open communication with the return ducts 9, and also with the longitudinal groove 6 of the brass.

When the journal reaches a relatively high speed oil accumulates in the longitudinal groove 6 of the brass faster than is required for the proper lubrication of the surface contact between the brass and journal and it, therefore, must expand, consequently the oil rises in the duct 7 from which it flows into the sump 8 in which it has a partial expansion, from which sump 8 it flows through the duct 12 into the tank 11 in which the volume of oil is permitted to spread thereby lowering the pressure. In ordinary railroad practice engines are not permitted to attain a speed that would force the oil over the top of the tank 11, therefore the surface oil fed to the bearing surface between the journal and the brass is taken care of and conserved. Now, as always happens in runs, the speed of the engine is reduced whereupon the oil in the tank 11, is free to automatically gravitate back through the duct 12, the sump 8 and the ducts 9, from which ducts it is discharged back into the oil cellar. In this connection attention is again called to the fact that these ducts 9 do not feed the oil to the bearing surface between the journal and the brass, but lead the oil to a point beyond that surface. This conservation of oil and the periodical gravitating of the oil back to the oil cellar, I have found in fast runs making one stop in 158 miles that the packing in the bottom of the cellar is just as rich and as well saturated with oil at the completion of the run as it was at the beginning of the trip. And this, without adding any oil to the cellar during the trip. This system and installation has been adopted as standard on one of the large railroad systems in this country and since its adoption the said railroad system has not had a hot bearing on any of the engines thus equipped.

Figure 9:
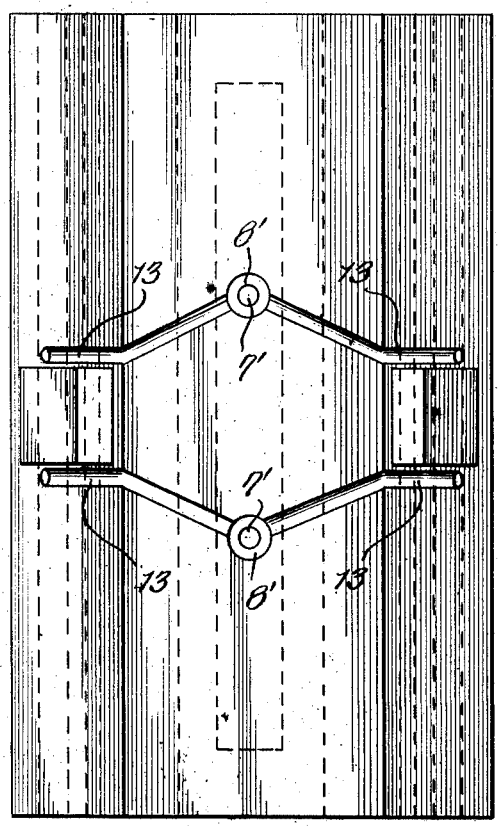
Figure 9 is a top plan view of a journal brass having two oil holes.
Figure 10:
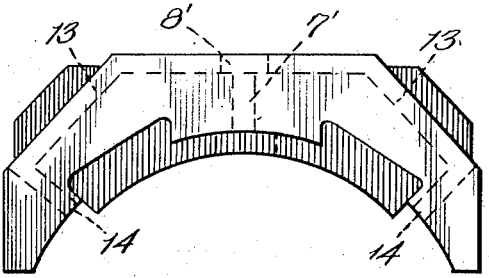
Figure 10 is an end view of Figure 9.
Figure 11:
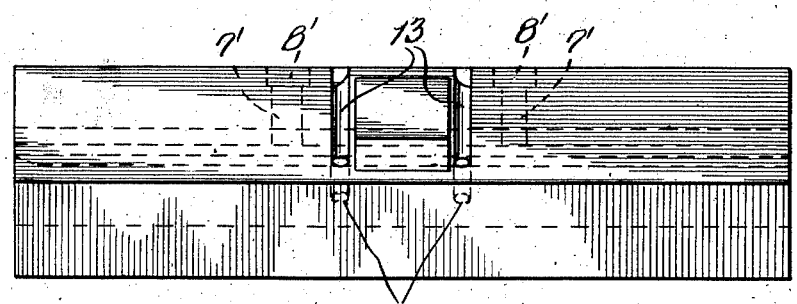
Figure 11 is a side elevation of Figure 9.

Since the complete success of my improved lubricating circulating system has been demonstrated and proven the railroad system referred to desire to have all of its engines thus equipped, but to throw away all of the brasses in use, which were still good for a long service, would be a rather expensive proceeding, therefore, I have found that I can utilize the old brasses and adapt them to carrying out my invention by forming, with a suitable tool, grooves 13 in the top face of the brass and drilling a hole 14 through the brass to communicate with the lower end of the groove 13, the upper ends of the grooves being in constant open communication with the sump 8' of the duct 7', and I have found that this adaptation of the old brasses to my system has proven satisfactory. In Figures 5, 6, 7 and 8, I have shown an old brass groove as just described in connection with the brass having one oil hole, while in Figures 9, 10 and 11 I have shown the old brass grooved from the two oil sumps 8'. By the term "old brass" I mean a brass which has been in service, but which is still serviceable.

In adapting old brass to my system I counterbore from the top of the duct 7' down to ½ inch and approximately ½ inch larger in diameter than the original oil duct 7' and thus form the oil tank 8' at the top of the journal brass.

While I have elected to illustrate my invention by the mechanical means shown in the drawings, it will be understood that I do not wish to be restricted to the exact details shown as other means may be used, and still be within the scope of my invention in flowing the surplus lubricate fed to a brass at high speed, to a sump and storing it in said sump and then permitting the oil to flow from said sump by gravity into the oil cellar of the journal box as the speed of the journal decreases, whereby the packing in the oil cellar is constantly kept rich and thoroughly saturated with oil.

What I claim is:

1. In a journal box a journal brass provided with a sump formed therein, an oil duct extending upward through the brass and in constant open communication with said sump, and constantly open return oil ducts formed in said brass and leading from said sump to return the oil to the oil cellar of the journal box.

2. In a journal box for locomotives, a brass provided with a sump formed therein, an oil duct open at both ends and extending upwardly through the brass and in constant open communication with said sump, and constantly open oil ducts formed in said brass and in constant open commuication at one end with said sump and opening through the brass at their other ends at a point beyond the line of contact between the journal and brass.

3. In a journal box, a brass provided with a vertical oil duct intersecting the top and bottom faces of the brass and having an increased diameter at its upper portion constituting a sump, oil ducts also formed in the brass and radiating from and in constant open communication with said sump, said ducts opening at their lower ends through the bottom face of the brass.

In testimony whereof I affix my signature.

ABRAHAM L. MOLER.